United States Patent [19]

Heitzman, III

[11] Patent Number: 4,858,334
[45] Date of Patent: Aug. 22, 1989

[54] METHOD AND APPARATUS FOR LOCATING THE WEB CENTER OF A BEAM

[75] Inventor: George D. L. Heitzman, III, Federal Way, Wash.

[73] Assignee: The Boeing Company, Seattle, Wash.

[21] Appl. No.: 175,415

[22] Filed: Mar. 30, 1988

[51] Int. Cl.⁴ .............................................. B23D 49/02
[52] U.S. Cl. ........................................ 33/673; 33/520
[58] Field of Search ................. 33/666, 520, 574, 579, 33/577, 578, 669, 677, 675, 644, 645, 562, 563, 673, 674, 670

[56] References Cited

U.S. PATENT DOCUMENTS

| | | | |
|---|---|---|---|
| 1,166,968 | 1/1916 | Carter | 33/520 X |
| 1,467,200 | 9/1923 | Sharpe | 33/574 |
| 2,660,802 | 12/1953 | Keys | 33/520 |
| 2,764,818 | 10/1956 | Gard | 33/520 |
| 2,777,208 | 1/1957 | Skraban | 33/520 |
| 3,874,086 | 4/1975 | Ludlam | 33/666 |

Primary Examiner—William D. Martin, Jr.
Attorney, Agent, or Firm—Seed and Berry

[57] ABSTRACT

A method and apparatus for locating the intersection of the center of the web of a beam with a flat upper surface of an end cap of the beam. The apparatus has an upper portion that contacts the flat upper surface of the end cap and has ends that extend beyond the edges of the end cap. Arms that depend downwardly from the ends of the upper portion extend symmetrically toward one another. The upper portion has a predetermined point that is colocated with the axis of symmetry of the arms and an upper surface of the upper portion. The ends of the arms are separated by a distance that is greater than the thickness of the web. When placed over the end cap of a beam, the apparatus is turned about the axis of symmetry until the two arms contact opposing sides of the web, thereby locating the desired web center. The upper portion of the apparatus is preferably made from a transparent material.

7 Claims, 2 Drawing Sheets

METHOD AND APPARATUS FOR LOCATING THE WEB CENTER OF A BEAM

GOVERNMENT RIGHTS

The Government has certain rights in this invention.

DESCRIPTION

1. Technical Field

This invention relates to a locating device, and more particularly, to a locating device for use with beams.

2. Background Art

A T-beam consists of a flat end cap extending perpendicularly from a web. An I-beam consists of two parallel flat end caps connected by a perpendicular web. When machine I- and T-beams, it is often necessary to locate the intersection of the extension of the center of the web with the flat end cap outer surface. This location must be precise in order to properly finish the product and to pass final product inspections. In many applications, the center of the beam web must be located within plus or minus 5 to 10 thousandths of an inch. Location of parts that incorporate I- or T-sections is difficult and timeconsuming to accomplish with the required accuracy because it requires that numerous precise measurements to be taken.

In the past, the center of an I- or T-beam was located by "probing" the beam. In this process, the beam was placed on the bed of the machine (for example, a 5-axis router) and the center of the web located at one end of the beam. The location of the web center can then be extrapolated along the length of the beam. This procedure is obviously less accurate than methods which directly determine the web center at the desired location along the beam.

It is therefore desirable to have a device and method that can accurately locate the center of the intersection between the web of a beam and the flat upper surface of the beam's end cap without the need to make numerous interim measurements.

DISCLOSURE OF THE INVENTION

It is an object of the present invention to provide a web center-locating device that is inexpensive and simple to use.

It is another object of the present invention to provide a web center-locating device that accurately locates the intersection of the web of an I- or T-beam with the upper surface of the beam's end cap.

According to one aspect, the invention consists of an apparatus for locating a center of a blind web having a predetermined thickness that is formed perpendicularly to a substantially planar upper surface of a beam cap having a predetermined width. The apparatus comprises an upper portion defining a substantially planar surface that can be brought into substantially parallel relationship with the planar upper surface. The upper portion includes a predetermined point for locating the beam center and first and second ends that extend beyond the width when the apparatus is in the parallel relationship. The apparatus also comprises a pair of arms depending from the first and second ends of the upper portion of the apparatus, the pair of arms is adapted to straddle the beam cap and reach toward one another. Each of the arms has an end, the ends being symmetrically displaced with respect to an axis passing through the predetermined point perpendicularly to the planar surface. The displacement of the ends is less than the width of the end cap and greater than the thickness of the blind web.

In another aspect, the invention consists of a method of locating a center of a blind web that has a predetermined thickness and is formed perpendicularly to a substantially planar upper surface of a beam cap. The beam cap has a predetermined width. The method includes the step of defining a plane substantially parallel to the planar upper surface. The plane contains a predetermined point that marks the web center. The method also includes the step of causing a pair of arms to be in fixed relationship with respect to the plane defined in the first step. The pair of arms is also caused to be symmetric with respect to an axis passing through the predetermined point on the plane defined in the first step and to be perpendicular to the planar upper surface. Finally, the method includes the step of turning the pair of arms about the axis until both of the arms come into contact with the web, whereby the web center is brought into coincidence with the axis.

BEST MODES FOR CARRYING OUT THE INVENTION

Figure 1:
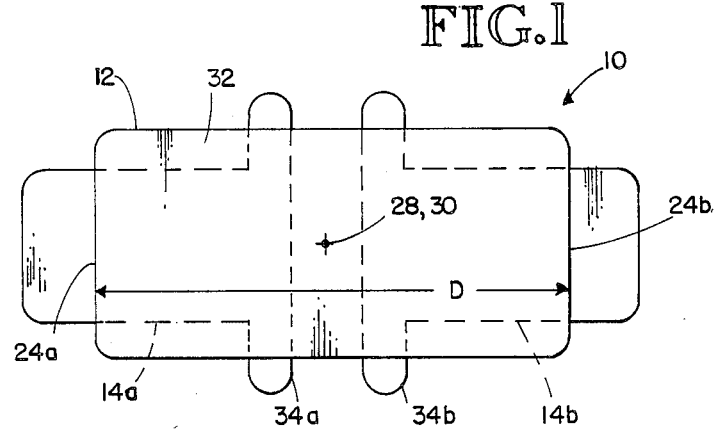
FIG. 1 is a top plan view of the inventive web center locating device.
Figure 2:
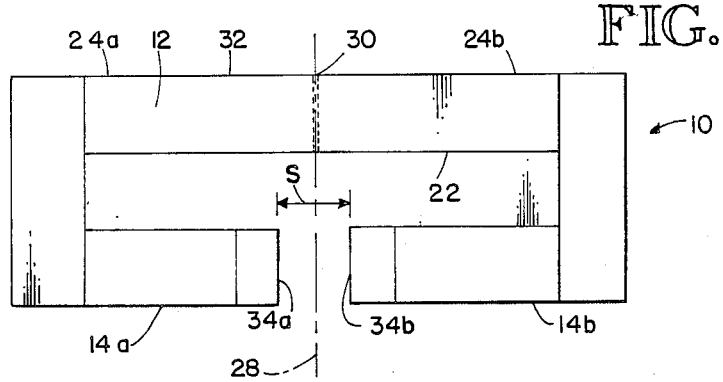
FIG. 2 is a side elevational view of the web center locating device.
Figure 3:
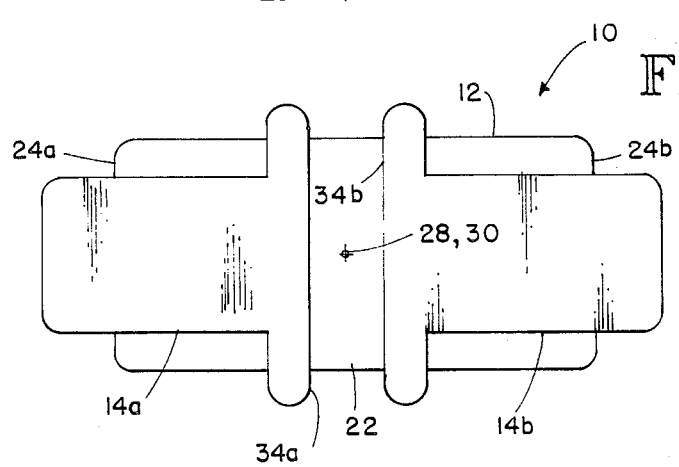
FIG. 3 is a bottom plan view of the web center locating device.

FIGS. 1-3 show various views of a preferred embodiment of the invention. The web center-locating device 10 consists of an upper portion 12 and a pair of arms 14a and 14b depending from the upper portion 12.

Figure 4:
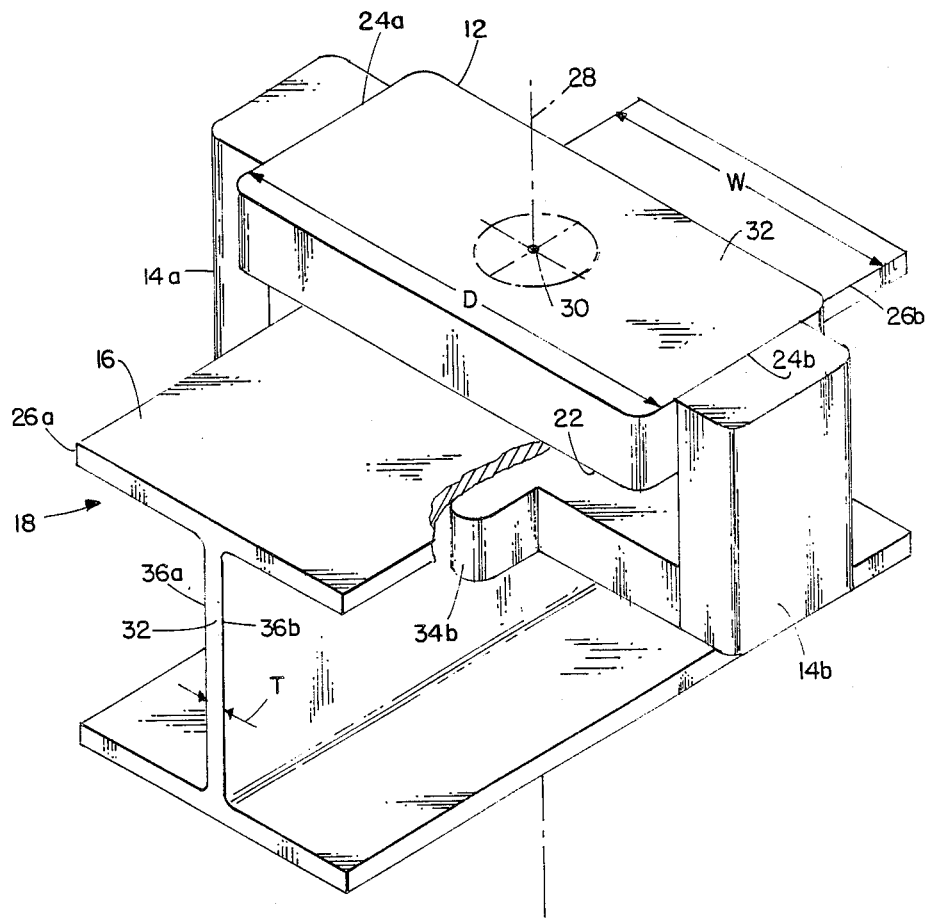
FIG. 4 is an isometric view of the inventive web center locating device in operative relationship with an I-beam.

The upper portion 12 includes positioning means for causing the web center-locating device 10 to assume a predetermined relationship with a substantially flat surface, such as the substantially planar upper surface 16 of the end cap 18 of a beam 20 (see FIG. 4). In a preferred embodiment, the positioning means is a substantially planar lower surface 22 formed on the underside of the upper portion 12. In other embodiments, the positioning means can be a conventional three-point contact system in which three points project downwardly from the upper portion 12 and define a substantially planar surface which is made coincident with the substantially planar upper surface 16 of the beam 20. It is desirable that the arms 14a and 14b depend downwardly from the upper portion 12 and perpendicularly from the plane defined by the positioning means of the upper portion 12.

The arms 14a and 14b depend from first and second ends 24a and 24b, respectively. The first and second ends 24a and 24b are separated by a distance D that exceeds the width W of the end cap 16 (see FIG. 4). Therefore, when the device 10 is placed over the end cap 16, the arms 14a and 14b project downwardly from the upper portion 12, outward of the edges 26a and 26b of the end cap 16. This allows the device 10 to be rotated about an axis 28 which passes through a predetermined centering point 30 on the upper portion 12 in a direction that is perpendicular to the plane defined by the positioning means of the upper portion 12. The centering point 30 can be indicated as a hole on the upper surface 32 of the upper portion 12, or in any other convenient manner. If a hole is used to indicate the centering point 30, it can be conveniently used to mark the upper surface 16 of the end cap 18.

As shown in FIG. 4, the device 10 can be placed in position over the end cap 18 of a beam 20. The beam 20 can be an I-beam, as shown, a T-beam, or any other form of beam having an end cap 16 that is arranged perpendicularly to the web 34 whose center is to be located on the upper surface 16 of the end cap 18. The arms 14a and 14b straddle the end cap 18 and reach toward one another. They are located symmetrically with respect to the axis 28 and displaced from one another by a separation S that exceeds the thickness T of the web 32. When the device 10 is placed on a beam 20, the device 10 is twisted about the axis 28 so that the arms 14a and 14b come into contact with the vertical surfaces 36a and 36b of the web 32. The end portions 34a and 34b of the arms 14a and 14b extend sufficiently in the longitudinal direction of the beam 20 so that the arms 14a and 14b contact the surfaces 36a and 36b before the arms 14a and 14b come into contact with the beam 20. For example, the arms 14a and 14b contact surfaces 36a and 36b before they contact the edges 26a and 26b.

Since the arms 14a and 14b are symmetric with respect to axis 28, the axis 28 is located precisely along the center of the web 32. Therefore, the centering point 30 is located exactly at the intersection of the center of the web 32 with the upper surface 16 of the end cap 18. After this location has been identified, it can be marked and, if desired, the device 10 can be moved along the beam 20 to define a continuous line indicating the location of the center of the web 32 with respect to the end cap 16.

It can be particularly advantageous for the upper portion 12 of the device 10 to made from Plexiglas, or some other transparent material, so that the person manipulating the device 10 over the beam 20 can visually verify that the device 10 is properly located.

While the preferred embodiment of the present invention has been described in detail in the foregoing, one skilled in the art will readily appreciate that various modifications of the above-described embodiment may be made without departing from the spirit and the scope of the invention. Accordingly, the spirit and the scope of the present invention are to be limited only by the following claims.

I claim:

1. An apparatus for locating a center of a blind web having a predetermined thickness and being formed perpendicularly to a substantially planar upper surface of a beam cap having a predetermined width, said apparatus comprising:

an upper portion defining a substantially planar surface that can be brought into substantially parallel relationship with said planar upper surface, said upper portion having a predetermined point thereon for locating said center; and a pair of arms fixedly depending from said upper portions at locations spaced apart from each other by at least the width of said beam cap so that said arms can straddle said beam cap, said arms having respective ends extending inwardly toward each other, said ends being symmetrically displaced from each other with respect to an axis passing through said predetermined point perpendicularly to said planar surface, the displacement of said ends being less than said width of said beam cap and greater than said thickness of said blind web, said axis passing through the center of the blind web when the apparatus is turned about said axis until said arms both contact the blind web.

2. The apparatus of claim 1 wherein said upper portion is made from a transparent material.

3. The apparatus of claim 1 wherein said upper portion comprises positioning means for defining said planar surface.

4. The apparatus of claim 3 wherein said positioning means is a substantially planar lower surface formed in said upper portion.

5. The apparatus of claim 3 wherein said positioning means is a three point contact system placed on a lower surface of said upper portion.

6. The apparatus of claim 1 wherein said predetermined point is indicated by a hole through the upper portion and centered about the predetermined point.

7. A method of locating a center of a blind web having a predetermined thickness and being formed perpendicularly to a substantially planar upper surface of a beam cap, said beam cap having a predetermined width, the method comprising the steps of:

(a) defining a plane substantially parallel to said planar upper surface, said plane containing a predetermined point that marks said web center;

(b) causing a pair of arms to be fixedly dependent from said plane at locations spaced apart from each other by at least the width of said beam cap so that said arms can straddle said beam cap, and having respective ends extending inwardly toward each other, said ends being symmetrically displaced from each other with respect to an axis passing through said predetermined point and perpendicular to said plane, the displacement of said ends being less than said width of said beam cap and greater than the thickness of the blind web; and (c) turning said pair of arms about said axis until both of said arms come into contact with said web, whereby said web center is brought into coincidence with said axis.

* * * * *

UNITED STATES PATENT AND TRADEMARK OFFICE
CERTIFICATE OF CORRECTION

PATENT NO. : 4,858,334

DATED : August 22, 1989

INVENTOR(S) : George D.L. Heitzman, III

It is certified that error appears in the above-identified patent and that said Letters Patent is hereby corrected as shown below:

In claim 1, column 4, line 7, delete "portions" and substitute therefor --portion--.

Signed and Sealed this

Twenty-fifth Day of September, 1990

Attest:

HARRY F. MANBECK, JR.

*Attesting Officer*   *Commissioner of Patents and Trademarks*